(12) United States Patent
Stahl (10) Patent No.: US 9,630,226 B2
(45) Date of Patent: Apr. 25, 2017

(54) METHOD FOR PRODUCING STEEL FIBERS (71) Applicant: CENT & CENT GMBH & CO KG, Erbach (DE)

(72) Inventor: Karl-Hermann Stahl, Voehringen (DE)

(73) Assignee: CENT & CENT GMBH & CO. KG (DE)

( * ) Notice: Subject to any disclaimer, the term of this patent is extended or adjusted under 35 U.S.C. 154(b) by 0 days.

(21) Appl. No.: 14/631,297

(22) Filed: Feb. 25, 2015

(65) Prior Publication Data

US 2015/0202670 A1 Jul. 23, 2015

Related U.S. Application Data (63) Continuation of application No. 13/002,734, filed as application No. PCT/DE2009/000736 on May 23, 2009, now abandoned.

(30) Foreign Application Priority Data

Jul. 23, 2008 (DE) .................... 10-2008-034-250 U (51) Int. Cl.
*B21C 37/00* (2006.01)
*B21B 1/16* (2006.01)
(Continued)

(52) U.S. Cl.
CPC ............ *B21B 1/163* (2013.01); *B23D 31/002* (2013.01); *B23P 17/06* (2013.01); *B26F 3/00* (2013.01);
(Continued)

(58) Field of Classification Search
None
See application file for complete search history.

(56) References Cited

U.S. PATENT DOCUMENTS 867,090 A 9/1907 Wolf
872,127 A 11/1907 Havemeyer
(Continued)

FOREIGN PATENT DOCUMENTS

DE 287820 C 6/1913
DE 540837 C 12/1931
(Continued)

OTHER PUBLICATIONS

JP 57094403 A—English abstract.
(Continued)

*Primary Examiner* — Daniel J Schleis
(74) *Attorney, Agent, or Firm* — J.A. Lindeman & Co., PLLC (57) ABSTRACT A method of making steel fibers, preferably for use as a concrete additive, and for the supply thereof in making steel fiber concrete, characterized in that to form the steel fibers (2) first a sheet-metal strip (1) is notched either on one face or both faces so as to form steel-fiber wires (4) that are initially connected together by webs (5), and that further, for subsequently converting the webs (5) into thin easily mutually separable separation webs forming separation surfaces that are fracture-rough and low in burring upon separation, the steel-fiber strip is subjected to a flexing process in which each web (5) is subjected to multiple bending deformations about its longitudinal axis in such a way that incipient cracks are produced at the webs (5) due to fatigue fracture and thus the separation webs are produced.

20 Claims, 8 Drawing Sheets (51) Int. Cl.
  *B23D 31/00* (2006.01)
  *B23P 17/06* (2006.01)
  *E04C 5/01* (2006.01)
  *B26F 3/00* (2006.01)
  *C04B 14/48* (2006.01)

(52) U.S. Cl.
  CPC ............. *C04B 14/48* (2013.01); *E04C 5/012* (2013.01); *Y10T 225/12* (2015.04); *Y10T 428/1234* (2015.01); *Y10T 428/12444* (2015.01)

(56) References Cited

U.S. PATENT DOCUMENTS

| | | | |
|---|---|---|---|
| 928,430 A | 7/1909 | Dudley | |
| 931,185 A | 8/1909 | Dudley | |
| 931,322 A | 8/1909 | Lindau | |
| 939,962 A | 11/1909 | Jenks | |
| 982,682 A | 1/1911 | Johnson | |
| 984,283 A | 2/1911 | Maxwell | |
| 1,023,149 A | 4/1912 | Havemeyer | |
| 1,076,439 A | 10/1913 | McKibbin | |
| 1,147,603 A | 7/1915 | Boyer | |
| 1,164,477 A | 12/1915 | Dale et al. | |
| 1,280,046 A | 9/1918 | Kuhne | |
| 1,364,182 A | 1/1921 | Conkling | |
| 1,423,163 A | 7/1922 | Simpson | |
| 1,477,378 A | 12/1923 | Ohlson et al. | |
| 1,635,658 A | 7/1927 | Boardman | |
| 2,053,375 A | 9/1936 | Nicholas | |
| 2,216,869 A | 10/1940 | Yoder et al. | |
| 2,347,904 A | 5/1944 | Greulich | |
| 2,635,493 A | 4/1953 | Schumacher | |
| 2,659,950 A | 11/1953 | West | |
| 2,775,151 A | 12/1956 | Schumacher | |
| 2,948,084 A | 8/1960 | Shockey | |
| 3,092,470 A | 6/1963 | Ripling | |
| 3,170,279 A | 2/1965 | Dubini | |
| 3,214,877 A | 11/1965 | Akin | |
| 3,628,710 A * | 12/1971 | Stehle ....................... B23C 3/28 225/3 |
| 3,953,953 A | 5/1976 | Marsden | |
| 4,008,597 A | 2/1977 | Bartram et al. | |
| 4,011,109 A | 3/1977 | Golland et al. | |
| 4,066,165 A | 1/1978 | Ruskin | |
| 4,109,500 A | 8/1978 | Franek | |
| 4,137,686 A | 2/1979 | Kern | |
| 4,155,238 A | 5/1979 | Rogers | |
| 4,267,985 A | 5/1981 | Rogers | |
| 4,305,187 A | 12/1981 | Iwamura et al. | |
| 4,804,585 A | 2/1989 | Tani et al. | |
| 4,883,713 A | 11/1989 | Destree et al. | |
| 4,960,649 A | 10/1990 | Takata et al. | |
| 5,039,366 A | 8/1991 | Strattman | |
| 5,215,830 A | 6/1993 | Cinti | |
| 5,451,471 A | 9/1995 | Over et al. | |
| 5,477,721 A | 12/1995 | Barnes | |
| 5,989,713 A | 11/1999 | Naaman | |
| 6,060,163 A | 5/2000 | Naaman | |
| 6,235,108 B1 | 5/2001 | Lambrechts | |
| 7,316,849 B2 | 1/2008 | Boegel et al. | |
| 2003/0152738 A1 | 8/2003 | Boegel et al. | |
| 2006/0121241 A1 | 6/2006 | Bonds | |
| 2007/0050960 A1 | 3/2007 | Stuhlbacher et al. | |
| 2007/0261354 A1 | 11/2007 | Chang | |
| 2010/0129678 A1 | 5/2010 | Stahl | |
| 2011/0212343 A1 | 9/2011 | Stahl | |

FOREIGN PATENT DOCUMENTS

| | | |
|---|---|---|
| DE | 805711 C | 5/1951 |
| DE | 1627152 A1 | 12/1970 |
| DE | 1930914 A1 | 12/1970 |
| DE | 2651126 A1 | 5/1977 |
| DE | 9000846 U1 | 6/1991 |
| EP | 0098825 A1 | 1/1984 |
| EP | 0392039 A | 10/1990 |
| EP | 0529105 A | 3/1993 |
| EP | 0608013 A | 7/1994 |
| EP | 0861948 A1 | 9/1998 |
| EP | 1356887 A2 | 10/2003 |
| EP | 1375773 A2 | 1/2004 |
| EP | 1623774 A1 | 2/2006 |
| EP | 1840291 A | 10/2007 |
| FR | 1382445 A | 12/1964 |
| GB | 537553 A | 6/1941 |
| GB | 664170 | 1/1949 |
| GB | 1247943 A | 9/1971 |
| GB | 2053754 A | 2/1981 |
| HU | 212747 B | 10/1996 |
| JP | 57094403 A | 6/1982 |
| JP | 58032529 A | 2/1983 |
| JP | 58143910 A | 8/1983 |
| JP | 61125719 A | 6/1986 |
| JP | 61067502 A | 5/1989 |
| JP | H1034253 A | 2/1998 |
| SU | 471164 A1 | 5/1975 |
| WO | 2008135002 A1 | 11/2008 |
| WO | 2011018063 A1 | 2/2011 |
| WO | 2011018064 A1 | 2/2011 |
| WO | 2011041995 A1 | 4/2011 |
| WO | 2012031577 A3 | 3/2012 |
| WO | 2013029595 A1 | 3/2013 |
| WO | 2013050013 A1 | 4/2013 |
| WO | 2013071912 A1 | 5/2013 |

OTHER PUBLICATIONS

EP 0098825A1—English translation.
EP 1356887—English abstract.
HU 212747—Claims as granted in English.
HU 212747—Abstract.
JP H1034253 A—English translation.
JP 60167502—Abstract.
JP 58032529—Abstract.
SU 471164 A1—machine translation.
EP 0392039 A—Abstract.
US4011109A English counterparts to DE 2651126 A.
DE 1627152 A—English abstract.
DE 9000846—machine translation.
International Search Report for PCT Application No. PCT/DE2009/000736 dated Jan. 28, 2010.
International Preliminary Report on Patentability for PCT Application No. PCT/DE2009/000736 dated Jan. 25, 2011.
International Preliminary Report on Patentability in International Application No. PCT/DE2008/000224, dated Nov. 10, 2009.

* cited by examiner

METHOD FOR PRODUCING STEEL FIBERS

TECHNICAL FIELD

The invention concerns a method of making steel fibers, preferably for use as a concrete additive, and for the supply thereof in making steel fiber concrete. It has proven to be advantageous in many areas of use to add steel fibers to concrete instead of or in addition to the usual structural steel mats, where in particular the formation of microcracks in the new concrete is prevented. In addition the simple processing affords enormous labor savings and gives the concrete a longer service life. Depending on the application it is also possible to achieve higher tensile and flex strength as well as a higher load-bearing capacity.

BACKGROUND

Nonetheless making the steel fibers is complicated and expensive as they have to be either milled, cut as sheet-metal fibers from sheeting or strips, stamped and shaped, or shaped, bent and cut to length in the form of wire fibers individually or in packets.

SUMMARY

The object of the invention is to provide a method of the kind set forth in the introduction of this specification, which permits simple and inexpensive production of steel fibers.

According to the invention that object is achieved in that to form the steel fibers first a sheet-metal strip is notched either on one face or both faces so as to form steel-fiber wires that are initially connected together by webs, and that further, for subsequently converting the webs into thin easily mutually separable separation webs forming separation surfaces that are fracture-rough and low in burring upon separation, the steel-fiber strip is subjected to a flexing process in which each web is subjected to multiple bending deformations about its longitudinal axis in such a way that incipient cracks are produced at the webs due to fatigue fracture and thus the separation webs are produced.

The advantage achieved by the invention is essentially that a sheet-metal strip is used as the starting material for the steel fibers, so that not only is an advantageous starting material available, but in addition shaping of a multiplicity of steel-fiber wires can be done.

In that respect in accordance with the invention as a further advantage there is the possibility of the steel-fiber wires in the notching operation being provided with anchor formations formed by interruptions in the notching operation. Those anchor formations thus represent local cross-sectional enlargements due to upsetting in the notching operation and relative to the notched cross-section of the steel fibers. Those interruptions can be provided relative to the notching projections in the rolling tool so that making steel-fiber wires with anchor formations is possible in one working step, with positioning of the anchor formations at the ends of the steel fibers being particularly effective.

In accordance with a first embodiment of the invention the method is performed in such a way that the steel-fiber wires are shaped to extend transversely to the longitudinal direction of the sheet-metal strip.

In that respect in a further advantageous configuration there is the possibility that the steel-fiber wire strip provided with anchor formations after the notching operation and extending over the entire width of the sheet-metal strip is subdivided by separating blades forming two or more steel-fiber strips.

In that respect it is further advantageous if the subdivision forming a plurality of steel-fiber strips is carried out prior to the flexing process.

In a further procedure it is recommended that the steel-fiber strips after the flexing process pass through a shaping roller for shaping the steel fibers (crooked ends, upset ends, wave shape and so forth) to correspond to the intended use.

Finally this procedure involves the possibility of the steel-fiber strips being wound up after complete manufacture thereof. When the steel-fiber strip is in the form of a coil, a large amount of steel fibers are in ordered relationship and can be easily and quickly separated and made available in a compact and readily transportable fashion for transport to the position of use thereof. Therefore the invention further provides that separation of the steel-fiber strips to form steel fibers is carried out at the location of concrete preparation. In that way it is possible to dispense with equipment and measures with which nowadays "clumping" (lump formation of steel fibers in the concrete) is to be avoided. It will be appreciated that it is also possible for the separation operation to be performed in the production line if that is desirable or necessary.

In an alternative configuration of the invention however the steel-fiber wires can also be shaped to extend longitudinally of the sheet-metal strip.

In that respect after the flexing process optionally the upper face and/or the lower face of the strip can be easily roughened by knurling, in which case however that is also possible in comparable fashion in respect of the above-described alternative with steel-fiber wires extending transversely to the longitudinal direction of the sheet-metal strip. That makes it possible to achieve better adhesion in the concrete.

After those method steps the steel-fiber strip could optionally be wound into a coil and the subsequent method steps could then be implemented at the location of concrete preparation with a suitable piece of equipment.

In that respect the method further provides that then the steel-fiber wires oriented longitudinally of the strip are separated from each other.

In the further course of the method after their separation the steel-fiber wires are subjected by a shaping tool to a shaping operation corresponding to the intended use. That can involve producing a crooked shape of the steel-fiber ends, a wave-shaped configuration extending longitudinally, or the like.

Finally in this procedure the steel-fiber wires after shaping thereof are cut to the desired length so that the individual steel fibers are ready for use for the further application thereof.

Notching of the sheet-metal strip is advantageously effected in a V-shape, so that a notch apex angle W should be between 30° and 120°. In that respect a notch apex angle W of about 60° has proven to be particularly advantageous.

The thickness of the web should advantageously be 20% to 95% of the thickness of the strip.

In accordance with the invention the depth of the V-shaped notches is advantageously so selected that it corresponds to the strength of the sheet-metal strip and the intended use of the steel fibers.

In addition it has proven to be advantageous in accordance with the invention if the flexing process includes multiple bending deformation to one side of the plane of the steel-fiber strip, until incipient fatigue-fracture cracks form in the webs at the notch bottoms. Alternatively the flexing process can also include multiple bending deformation to both sides of the plane of the steel-fiber strip, until incipient fatigue-fracture cracks form at the webs at the notch bottoms.

In that respect the flexing process can take place in such a way that multiple bending deformation of the webs is done through equal angles in each case. Depending on the respective situation of use and material nature instead however it may also be more advantageous if the multiple bending deformation of the webs is done to one or both sides through increasing or also decreasing angles.

Preferably, multiple bending deformation of the webs should be effected at an angle less than the notch angle.

To completely separate the steel-fiber wires from each other the separation web can be broken by slight, oppositely directed deflection of immediately juxtaposed steel-fiber wires. More specifically in the case of steel fibers that extend transversely to the strip direction, the separation web can be severed in a separation apparatus like a zip fastener and thus the steel fibers can be individually separated while, in the case of the steel-fiber wires that extend longitudinally of the strip, the separation operation is carried out by shaping rollers by slight, oppositely directed deflection of immediately adjacent steel-fiber wires and thereafter the steel fiber is shaped and cut to length.

Preferably semifinished material of metal in strip form is used as the starting material.

With regard to the apparatus the object of the invention is attained by a steel-fiber strip of metal that has a plurality of mutually parallel steel-fiber wires connected together by webs and produced in accordance with at least one of the preceding method claims, characterized in that semifinished material in strip form is used as starting material and for forming the steel-fiber wires is notched on one face or on both faces and in the notching operation is provided with anchor formations, the webs being converted by multiple bending deformations by a flexing process to provide thin, easily separable separation webs that form low-burring and fracture-rough separation surfaces upon separation and that have fatigue fractures or incipient fatigue-fracture cracks and the steel-fiber wires and the steel-fiber strips are subjected to a shaping operation, steel fibers suitable as an additive to concrete being formed in the separation operation of the steel-fiber strips or the steel-fiber wire strips.

Incipient fatigue-fracture cracks are produced at the notch bottoms by the flexing process so that the webs are weakened. The remaining web residues—referred to as separation webs—can be very thin because they are at the neutral fiber of the bending operation; the steel-fiber wires can thus be later easily separated from each other into individual fibers.

Here high-quality steel-based or iron-based materials in all strength states that are standard on the market are provided as the metallic starting material. If the intended use requires it, the metallic starting material can also be coated in the form of metal strips, in particular galvanized or copper-plated steel strip. It is desirable in that respect in particular that the metallic material involved is materials with which—if required—particularly high strength values can also be achieved by rolling, for the respective group of materials.

Finally the invention concerns a steel fiber produced in accordance with the above-described method. It is characterized in that it is formed from semifinished material in strip form that is used as the starting material and that, for forming steel-fiber wires that are initially still connected together by webs, is notched on one face or on both faces and is provided with anchor formations in the notching operation, the webs being converted by multiple bending deformations by a flexing process to provide thin separation webs that form easily mutually separable separation surfaces that have low burring, are fracture-rough upon separation, and have a fatigue fracture. In that way that steel fiber forms a completely novel type of steel fiber.

In that respect it is desirable if the steel fiber is of a shape suitable for addition to concrete.

BRIEF DESCRIPTION OF THE DRAWINGS

The invention is described in greater detail hereinafter by means of embodiments by way of example illustrated in the drawing in which:

FIG. 5 shows the notched strip subjected to flexing and intended for making the steel-fiber strip or the steel-fiber wire strip when bent, in FIG. 5a for steel-fiber wires extending longitudinally of the strip direction and in FIG. 5b for steel-fiber wires extending transversely of the strip direction.

DETAILED DESCRIPTION

Figure 1:
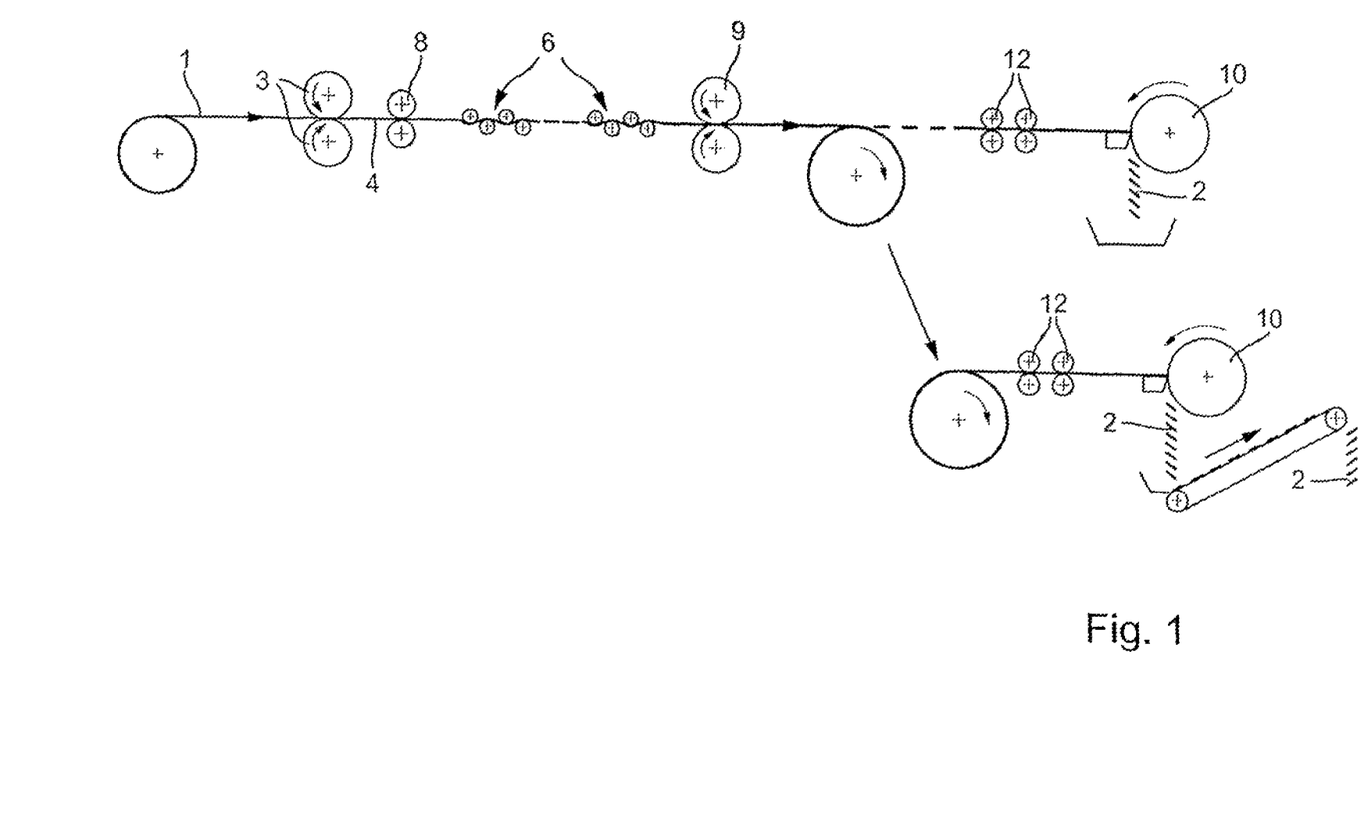
FIG. 1 is a diagrammatic view of the procedure according to the invention in a first embodiment with a steel-fiber wire extending transversely of the strip direction.
Figure 2:
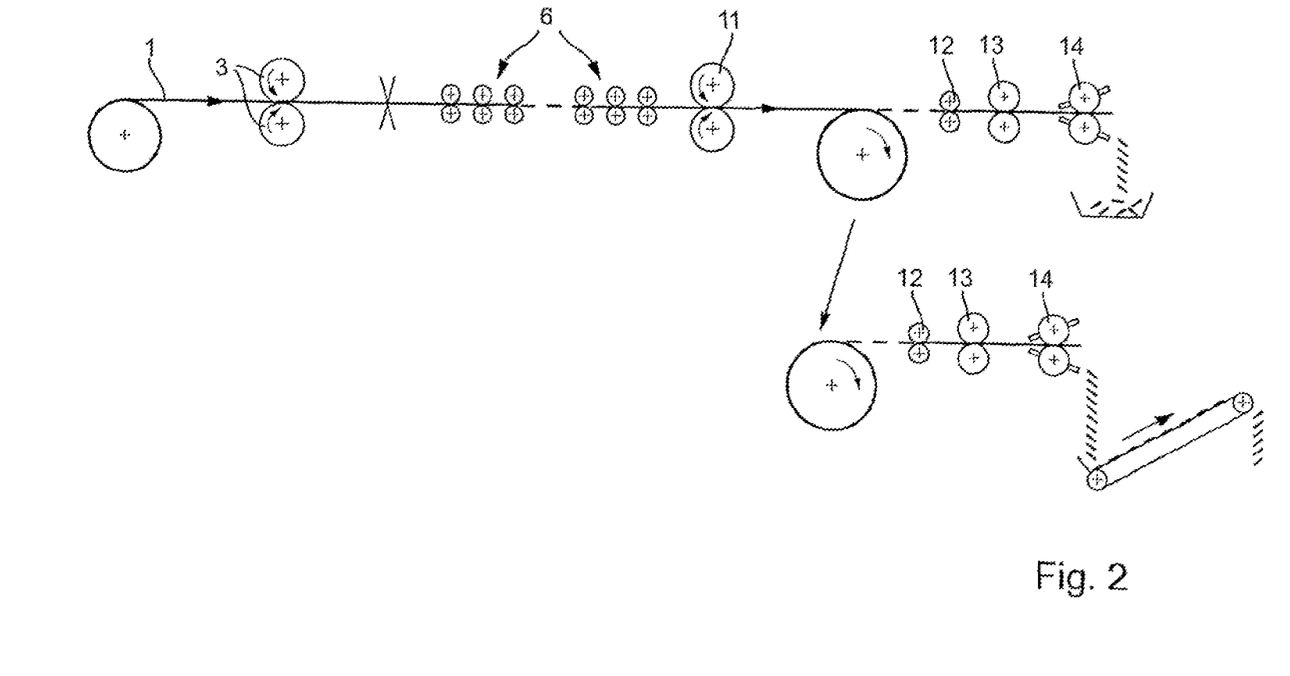
FIG. 2 shows a view corresponding to FIG. 1 of the procedure in an alternative configuration, with a steel-fiber wire extending longitudinally of the strip direction.
Figure 4:
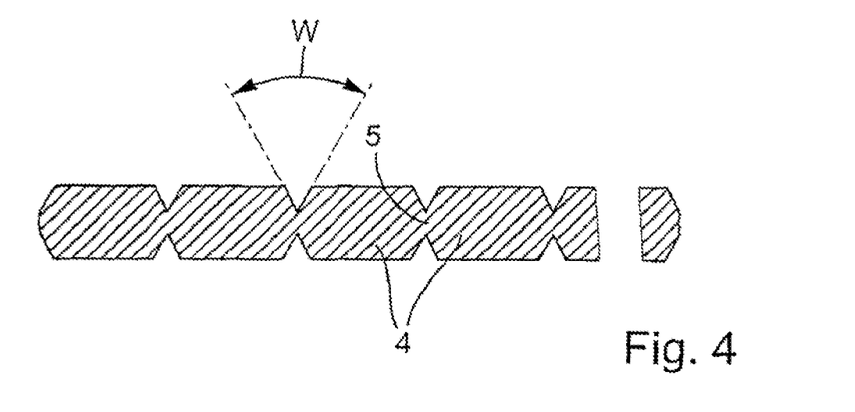
FIG. 4 shows a cross section through a notched strip of which only part is shown and that is intended for making the steel-fiber strip or steel-fiber wire strip, with notching already done.

The method diagrammatically shown in the drawing, in particular in FIGS. 1 and 2, serves for making steel fibers 2 that are preferably used as a concrete additive. For that purpose, for forming the steel fibers 2, first a sheet-metal strip 1 is notched either on one face or on both faces between rollers 3, thereby forming steel-fiber wires 4 having anchor formations 7. Here, the steel-fiber wires 4 are to start with still connected together by webs 5, as can be seen from FIG. 4.

For subsequently converting the webs 5 to make thin, easily mutually separable separation webs that, when separated, form low-burring and fracture-rough separation surfaces, the steel-fiber strip formed by the steel-fiber wires 4 is flexed such that each web 5 is subjected to multiple flexings about its longitudinal axis as indicated in the drawing at 6. This way the regions of the webs 5 are formed with incipient cracks, due to fatigue fracture, and the separation webs are produced. Moreover, incipient scratching of the surface is done between the notches so that fatigue fracture is also triggered there to extend the bases of the notches.

Figure 3:
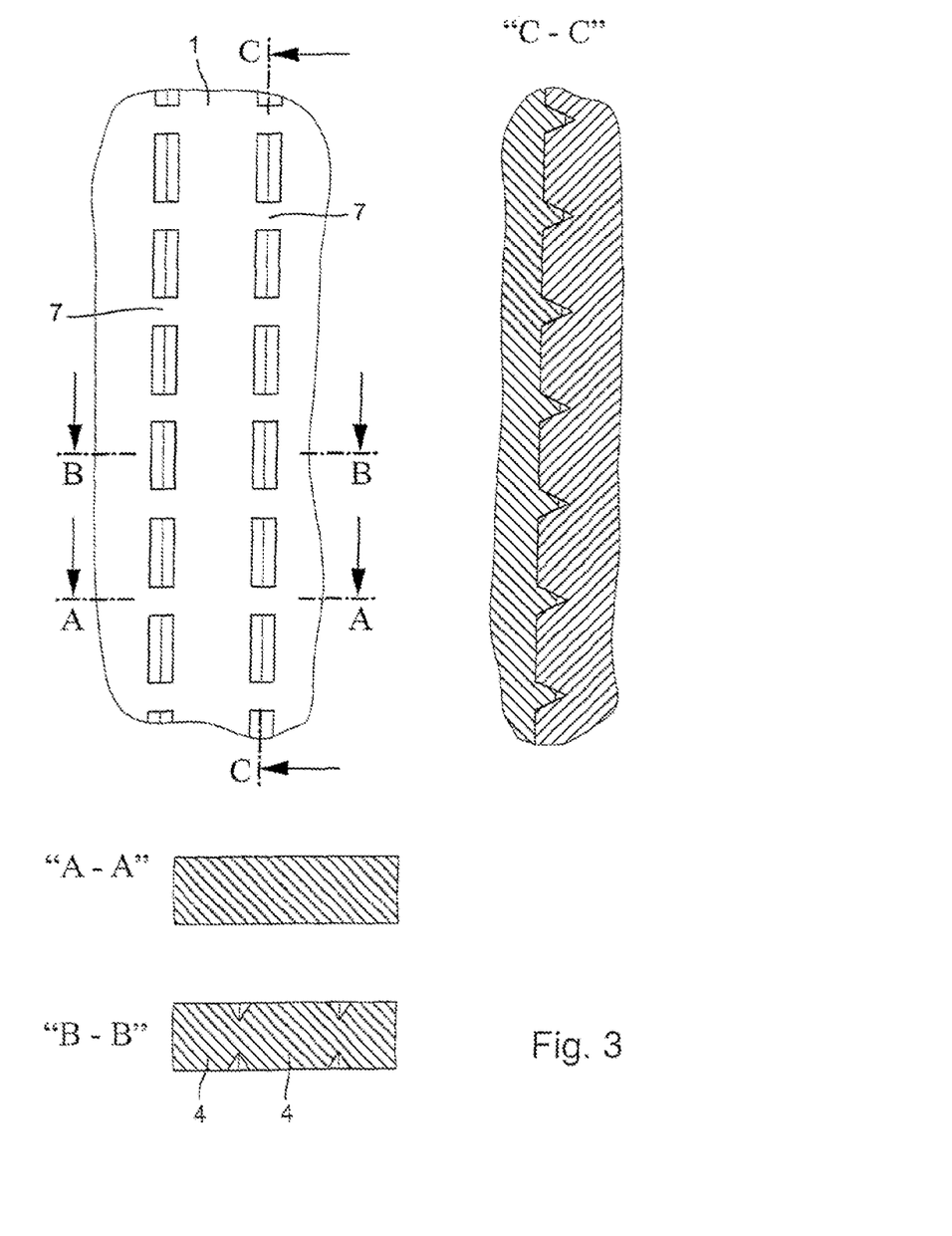
FIG. 3 shows a detail view of the notching roll, shown in developed form.
Figure 9:
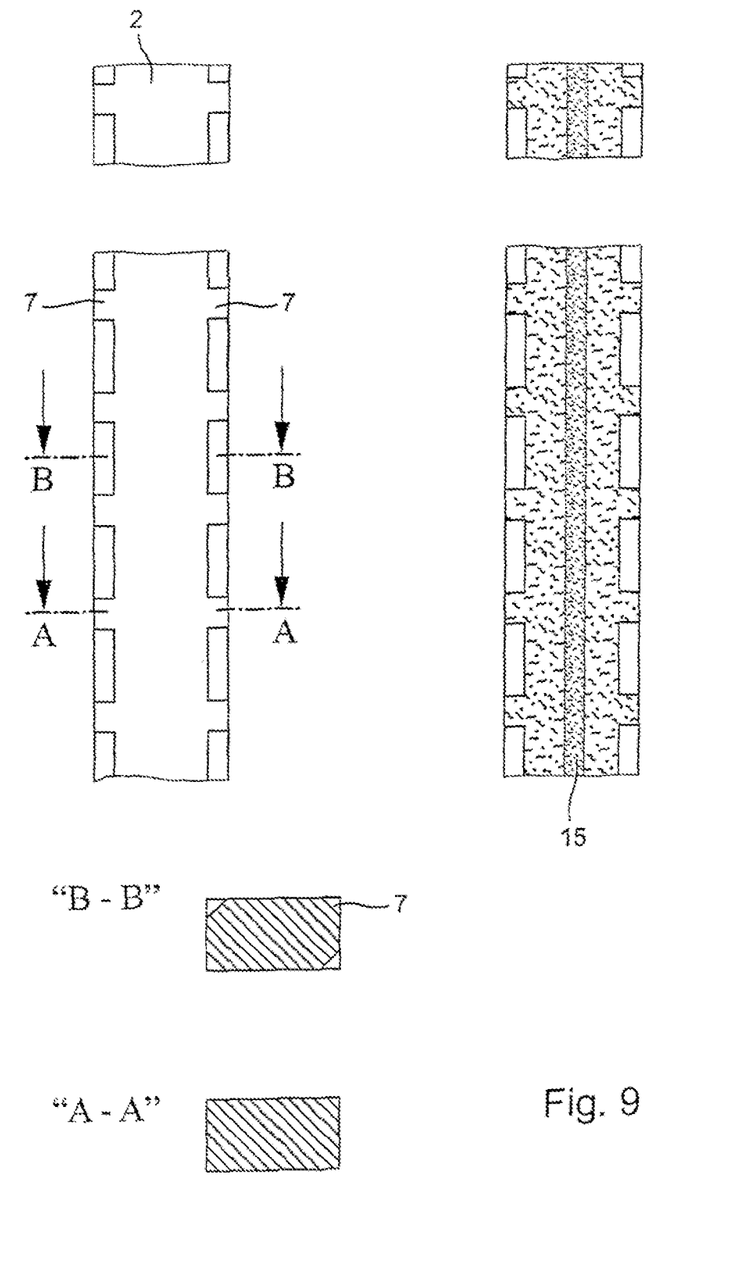
FIG. 9 shows different views of an individual steel fiber.

During notching the steel-fiber wires 4 can also be provided with anchor formations 7 in the form of cross-sectional enlargements relative to the steel fiber cross-section, as can be seen from FIGS. 3 and 9. They serve for better anchoring the steel fibers 2 in the concrete and can be positioned at the appropriate location, corresponding to the intended use. In FIG. 9 the flexing fracture surface is also shown at 15.

In the configuration of the invention shown in FIG. 1 the steel-fiber wires 4 extend transversely to the longitudinal direction of the sheet-metal strip 1. Depending on the desired length of the steel fibers 2 they can either extend over the entire width of the sheet-metal strip 1; it is however also possible to provide separating blades 8 that subdivide the steel-fiber wire strip 1 into two or more steel-fiber substrips. That subdivision of the steel-fiber wire strip is desirably done prior to the flexing process.

Figure 10:
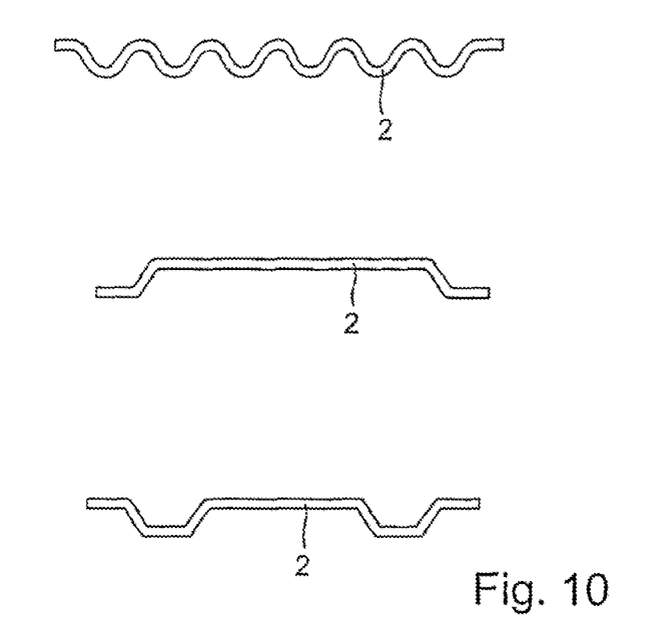
FIG. 10 shows a different configuration of individual steel fibers.
Figure 11:
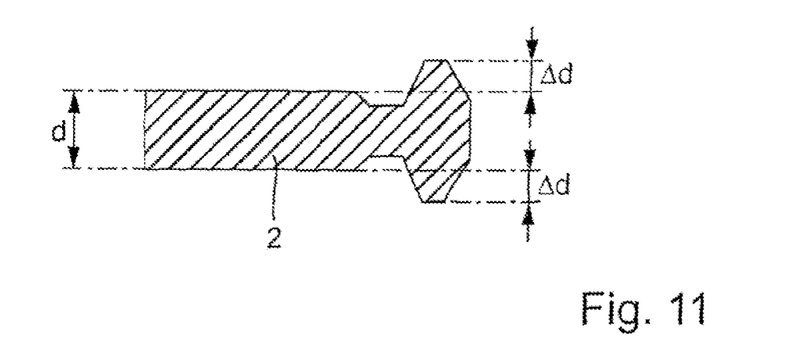
FIG. 11 shows a steel fiber with an end cross-sectional enlargement in comparison with the cross-section of the steel fiber.

After the flexing process the steel-fiber wire strip or strips pass through a shaping roller 9 that imparts to the steel fibers 4 a shape corresponding to the later intended use. As shown in FIG. 10 the ends of the steel fibers 2 can be for example of a crooked configuration; similarly the steel fibers 2 can be converted into a wavy shaped or shaped in some other suitable fashion. In particular the shape of the steel fiber ends can be altered, more specifically in the nature of an enlargement, as indicated in FIG. 11. That enlargement or thickening leads to particularly effective anchoring in the concrete.

After complete manufacture, the steel-fiber strips are wound into a coil so that they can be transported to the later position of use easily and in a space-saving fashion.

Figure 8:
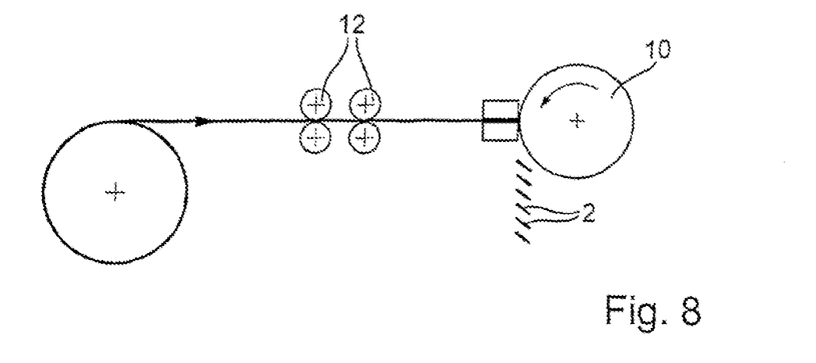
FIG. 8 shows a separation apparatus for separating the steel fibers.

The step of separating the steel-fiber strips to obtain steel fibers 2 is thus carried out only at the location of concrete preparation, and for that purpose an individual separator as shown in FIG. 8 can be used. This is a high-speed toothed wheel 10 that separates the individual steel fibers 2. This further gives the advantage that, when the step of separating the steel fibers from one another is done at the concrete preparation location, the individual steel fibers 2 can be more homogeneously introduced into the concrete while otherwise—if the steel fibers 2 are supplied in already separated form—they have a tendency to "clumping" and thus result possibly in irregular distribution in the concrete.

There is however also the possibility of the steel-fiber wires 4 extending longitudinally of the sheet-metal strip 1, as shown diagrammatically in FIG. 2. In principle the procedure here is very similar; in addition here there is a further pair of rollers 11 that, after the flexing procedure, optionally roughen up the upper and/or the lower face of the strip 1 by knurling. That however is in principle also possible in the first variant of the operating procedure, in a similar form.

Here however, following the flexing process, the steel-fiber wires 4 extending longitudinally of the strip are separated from each other at 12. After that separation the shaping operation is then again done by means of a special shaping tool 13 which imparts to the steel fibers 2 the shaping required for the later use.

After that shaping operation the steel-fiber wires 4 are cut to the desired length for example by rotary shears 14 so that the steel fibers 2 can be packaged in separated condition and taken to the later location of use. The steel-fiber wire strip can also be wound up into a coil after the flexing process and the operation of separating the steel fibers can then be carried out by a suitable piece of equipment that separates, shapes and cuts them to length, at the location of concrete preparation.

Notching the sheet-metal strip 1 is effected in a V-shape, the notch angle W being between 30° and 120°, a notch angle W of about 60° being preferred.

The thickness of the initially remaining web 5 is in this case usually 20% to 95% of the thickness of the strip 1.

In accordance with the invention the depth of the V-shaped notches is advantageously so selected that it corresponds to the strength and purpose of use of the steel fibers.

Figure 5A:
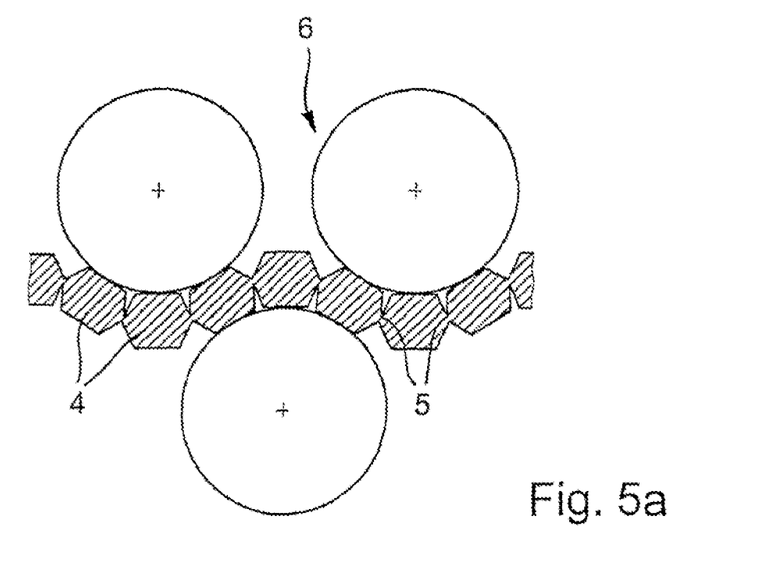
Figure 5B:
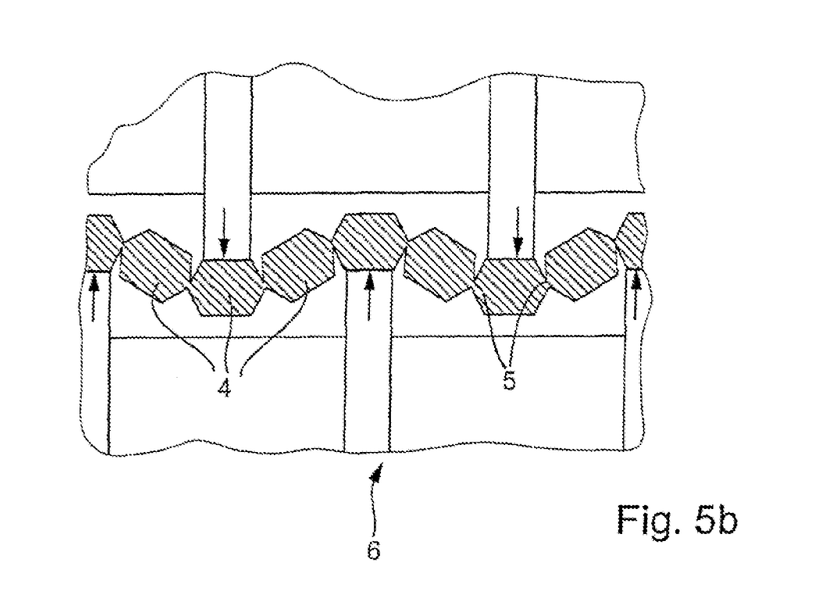

The flexing process can take place in different ways; thus it is first conceivable that only multiple flexing deformation to one side relative to the plane of the steel-fiber strip 1 is done until fatigue fracture occurs at the webs 5. Equally however the flexing process can also entail multiple flexing deformation to both sides with respect to the plane of the steel-fiber strip, in which case the multiple flexing deformation of the webs 5 can either be done by identical angular amounts or however through increasing or decreasing angles. Details in that respect are also to be found in particular in FIGS. 5*a* and 5*b*.

In any event multiple flexing deformation of the webs 5 should be at an angle which is less than the notch angle W.

Figure 6:
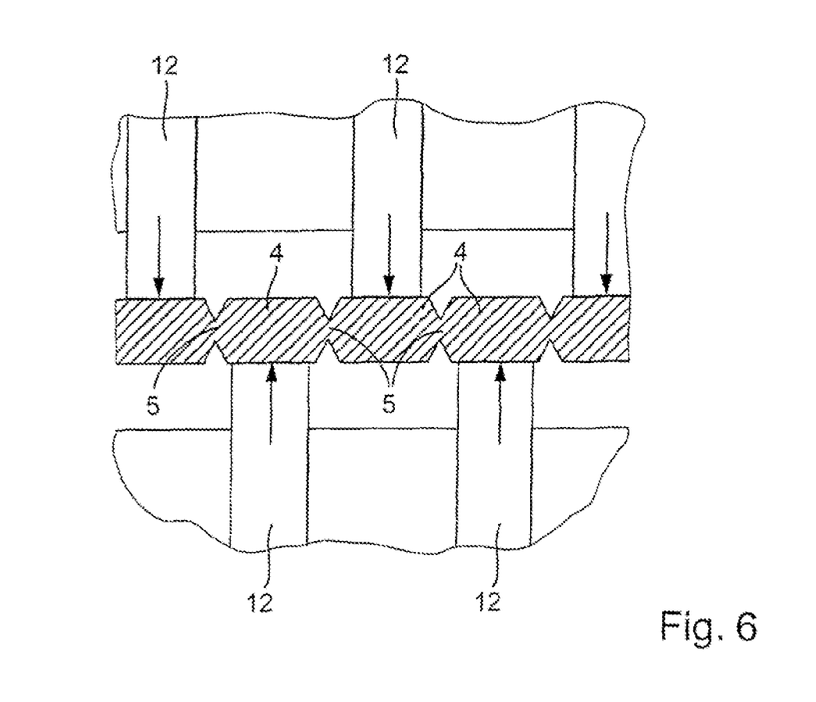
FIG. 6 shows a system for severing the separation webs of the steel-fiber strip or steel-fiber wire strip.
Figure 7:
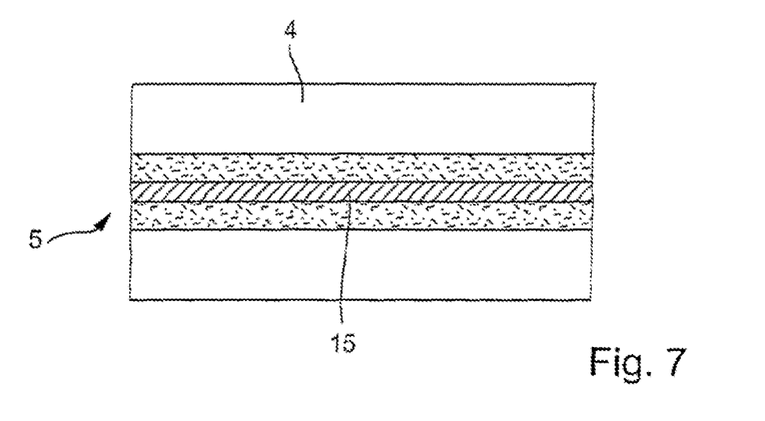
FIG. 7 shows an only partial view in section through the wire strip at a notch.

The separation webs in the case of the longitudinally oriented steel fibers are then broken locally transversely relative to the strip 1 by slight, oppositely directed deflection of immediately adjacent steel-fiber wires, which can be carried out by suitable shaping rollers and is shown in FIG. 6. In the case of transversely extending steel fibers, the separation operation is done in the separator (FIG. 8) as the last method step.

Usually the starting material used is semifinished metal in strip form, in which case in particular high-quality steel- or iron-based materials in all strength standard on the market are recommended. Insofar as particular purposes of use make it necessary it is also possible for that purpose to use coated metal strips, in particular galvanized or copper-plated steel strip. In any event the metallic material preferably is a material with which particularly high strength values can also be achieved by rolling, for the particular material group.

Finally a steel fiber produced in accordance with the above-described method is also the subject of the invention. It is formed from semifinished material in strip form as the starting material, and, to produce steel-fiber wires 4 that are initially connected together by webs 5, is notched on one or both faces. In the notching operation they are provided with anchor formations. The anchor formations are regions of larger cross-section of the steel fibers, which have been left by the notching operation by virtue of a suitable tool configuration and which are even still somewhat upset in the notching operation. The anchor formations are preferably positioned at the ends of the steel fibers, in that respect there also being the possibility of transversely extending steel fibers also being notched such that their transverse ends are also upset.

The webs 5 are subjected to incipient cracking on both faces due to fatigue fracture by virtue of multiple bending deformations by a flexing process and the web residue—the separation web—is later separated practically without deformation so that the separation surfaces have a low degree of burring and are fracture-rough.

The upper face and the lower face of the steel fibers can also be knurled and in addition the steel fiber can be provided with a shape suitable for addition to concrete and the intended use.

The claimed invention is:

1. A method of making steel fibers for use as a concrete additive, and for the supply thereof in making steel fiber concrete, the method comprising the steps of:
   to form the steel fibers, first notching a sheet-metal strip on one face or both faces so as to form steel-fiber wires that are initially connected together by webs, and
   thereafter, for converting the webs into thin easily mutually separable separation webs forming separation surfaces that are fracture-rough and low in burring upon separation, flexing the steel-fiber strip by subjecting each web to multiple bending deformations about its longitudinal axis, wherein the strip is alternated between an inclined position and a declined position with respect to the lateral width of the strip as the strip is subjected to the multiple bending deformations and in such a way that incipient cracks are produced at the webs due to fatigue fracture and thus the separation webs are produced.

2. The method according to claim 1, wherein in the notching operation the steel-fiber wires are provided with anchor formations formed by interruptions in the notching operation.

3. The method according to claim 1 wherein the steel-fiber wires are formed transversely to the longitudinal direction of the sheet-metal strip.

4. The method according to claim 1 wherein the steel-fiber wire strip, which after the notching operation extends over the entire width of the sheet-metal strip, is subdivided by separation blades into two or more steel-fiber substrips.

5. The method according to claim 4, wherein the steel-fiber wire strip is subdivided prior to the flexing process.

6. The method according to claim 1 further comprising: passing the steel-fiber strips through a shaping roller.

7. The method according to claim 1 wherein the steel-fiber wires are formed longitudinally of the sheet-metal strip.

8. The method according to claim 1, wherein the steel-fiber wires oriented longitudinally of the strip are separated from each other.

9. The method according to claim 1 further comprising: separating the steel-fiber strip in the separation web; and shaping after the steel-fiber wires with a shaping tool.

10. The method according to claim 1 wherein the notching produces notches of V-shape.

11. The method according to claim 10, wherein a notch angle is between 30° and 120°.

12. The method according to claim 1, wherein the thickness of the webs is 20% to 95% of the thickness of the strip.

13. The method according to claim 1, wherein the flexing process includes multiple bending deformation to one side of a plane of the steel-fiber strip until fatigue fracture at the webs.

14. The method according to claim 1 wherein the flexing process includes multiple bending deformation to both sides of a plane of the steel-fiber strip until incipient fatigue fracture cracks occur at the webs.

15. The method according to claim 14, wherein the multiple bending deformation of the webs is done through an angle less than the notch angle.

16. The method according to claim 1 wherein the separation webs are locally broken by slight oppositely directed deflection of immediately adjacent steel-fiber wires.

17. A steel-fiber strip or steel-fiber wire strip of metal having a plurality of parallel steel-fiber wires connected together by webs and produced in accordance with claim 1, wherein semifinished material in strip form is used as starting material and that, for forming steel-fiber wires initially still connected together by webs, is notched on one face or on both faces and in the notching operation is provided with anchor formations, wherein the webs are converted by multiple bending deformations by means of a flexing process to form thin easily separable separation webs that form low-burring and fracture-rough separation surfaces upon separation and that have fatigue fractures, and the steel-fiber wires and the steel-fiber strips are subjected to a shaping operation such that steel fibers suitable as an additive to concrete are formed in the individual separation operation of the steel fibers from the steel-fiber strip or the steel-fiber wire strip.

18. The steel-fiber strip or steel-fiber wire strip according to claim 17, wherein the starting material includes at least one of galvanized steel and copper-plated steel.

19. The steel-fiber strip or steel-fiber wire strip according to claim 17, wherein the metallic starting material is a material with which particularly high strength values can also be achieved by rolling for the respective material.

20. The steel fiber strip or steel fiber wire strip of claim 17, wherein the separation web includes a substantially burr-free wire when separated from an adjacent steel fiber strip.

* * * * *